United States Patent
Yu et al.

(10) Patent No.: US 9,455,470 B2
(45) Date of Patent: Sep. 27, 2016

(54) NON-AQUEOUS ELECTROLYTE AND LITHIUM SECONDARY BATTERY USING THE SAME

(71) Applicant: LG CHEM, LTD., Seoul (KR)

(72) Inventors: Sung-Hoon Yu, Daejeon (KR); Doo-Kyung Yang, Daejeon (KR); Min-Hyung Lee, Daejeon (KR); Min-Jung Jou, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/866,057

(22) Filed: Apr. 19, 2013

(65) Prior Publication Data

US 2013/0230781 A1    Sep. 5, 2013

Related U.S. Application Data

(63) Continuation of application No. PCT/KR2012/004570, filed on Jun. 8, 2012.

(30) Foreign Application Priority Data

Jun. 8, 2011  (KR) .................. 10-2011-0055197
Jun. 8, 2011  (KR) .................. 10-2011-0055198
Jun. 8, 2012  (KR) .................. 10-2012-0061584

(51) Int. Cl.

| H01M 10/056 | (2010.01) |
|---|---|
| H01M 10/052 | (2010.01) |
| H01M 10/0567 | (2010.01) |
| H01M 10/0569 | (2010.01) |
| H01M 4/505 | (2010.01) |

(Continued)

(52) U.S. Cl.
CPC ........... *H01M 10/056* (2013.01); *H01M 4/505* (2013.01); *H01M 4/523* (2013.01); *H01M 4/5825* (2013.01); *H01M 10/052* (2013.01); *H01M 10/0567* (2013.01); *H01M 10/0569* (2013.01); *H01M 2300/0028* (2013.01); *Y02E 60/122* (2013.01)

(58) Field of Classification Search
USPC ....................................................... 429/332
See application file for complete search history.

(56) References Cited

U.S. PATENT DOCUMENTS

5,484,669 A *  1/1996  Okuno .............. H01M 10/0569
                                                    429/199
6,589,689 B2   7/2003  Oura et al.
6,958,198 B2  10/2005  Iwamoto et al.

(Continued)

FOREIGN PATENT DOCUMENTS

CN      101640290 A    2/2010
JP    2001-0098486 A   11/2001

(Continued)

OTHER PUBLICATIONS

U.S. Appl. No. 61/423,147, provisional application disclosure, filed Dec. 15, 2010.*

(Continued)

*Primary Examiner* — Lucas J O'Donnell
(74) *Attorney, Agent, or Firm* — Birch, Stewart, Kolasch & Birch, LLP

(57) ABSTRACT

The present invention provides a non-aqueous electrolyte solution for a lithium secondary battery, comprising an ester-based compound having a branched-chain alkyl group; and a lithium secondary battery using the same.

20 Claims, 6 Drawing Sheets

(51) Int. Cl.
*H01M 4/52* (2010.01)
*H01M 4/58* (2010.01)

(56) References Cited

U.S. PATENT DOCUMENTS

| | | |
|---|---|---|
| 2001/0038949 A1 | 11/2001 | Hatazaki et al. |
| 2001/0053474 A1 | 12/2001 | Oura et al. |
| 2003/0165733 A1* | 9/2003 | Takehara .............. H01M 4/364 429/101 |
| 2007/0287071 A1 | 12/2007 | Chiga et al. |
| 2009/0297929 A1* | 12/2009 | Uchida ............. H01M 10/0431 429/94 |
| 2010/0028786 A1 | 2/2010 | Takahashi |
| 2010/0273065 A1 | 10/2010 | Lee et al. |
| 2011/0111305 A1* | 5/2011 | Jeon ................. H01M 10/0525 429/326 |
| 2013/0260229 A1* | 10/2013 | Uzun et al. .................. 429/200 |

FOREIGN PATENT DOCUMENTS

| | | |
|---|---|---|
| JP | 2001-357838 A | 12/2001 |
| JP | 2002-0002194 A | 1/2002 |
| JP | 2004-47131 A | 2/2004 |
| JP | 2006-32301 A | 2/2006 |
| JP | 2009-301954 A | 12/2009 |
| JP | 2010-56076 A | 3/2010 |
| KR | 10 2008-0108043 A | 12/2008 |
| KR | 10-2009-0018003 A | 2/2009 |

OTHER PUBLICATIONS

International Search Report issued in PCT/KR2012/004570, mailed on Dec. 21, 2012.

* cited by examiner

NON-AQUEOUS ELECTROLYTE AND LITHIUM SECONDARY BATTERY USING THE SAME

CROSS-REFERENCE TO RELATED APPLICATION

The present application is a continuation of International Application No. PCT/KR2012/004570 filed on Jun. 8, 2012, which claims priority to Korean Patent Application Nos. 10-2011-0055197 and 10-2011-0055198 filed in the Republic of Korea on Jun. 8, 2011, and Korean Patent Application No. 10-2012-0061584 filed on Jun. 8, 2012, the disclosures of which are incorporated herein by reference.

TECHNICAL FIELD

The present invention relates to a non-aqueous electrolyte solution for a lithium secondary battery, which comprises an ester compound having a branched-chain alkyl group, and a lithium secondary battery using the same.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

Among secondary batteries currently used, a lithium secondary battery developed in the early 1990's comprises an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

The lithium secondary battery has an average discharge voltage of about 3.6 to 3.7V, which is advantageously higher than those of other batteries such as alkali batteries or nickel-cadmium batteries. In order to provide such a high operation voltage, an electrolyte composition electrochemically stable in a charging/discharging voltage range of 0 to 4.2 V is required. For this purpose, a mixed solvent in which a cyclic carbonate compound such as ethylene carbonate and propylene carbonate, and a linear carbonate compound such as dimethyl carbonate, ethyl methyl carbonate and diethyl carbonate are suitably mixed to be used as a solvent of the electrolyte solution. A typical electrolyte solution uses lithium salt such as $LiPF_6$, $LiBF_4$ and $LiClO_4$ as solutes, which acts as a source for supplying lithium ions in a battery and thus enables the lithium battery to operate.

During the initial charging process of the lithium secondary battery, lithium ions emitted from a cathode active material such as a lithium-metal oxide is transferred into an anode active material such as graphite and inserted between the layers of the anode active material, at which high reactive lithium reacts with the electrolyte solution and carbon present in the anode active material on the surface of the anode active material such as graphite to produce a compound such as $Li_2CO_3$, $Li_2O$ and LiOH. The produced compound forms a kind of a solid electrolyte interface (SEI) layer on the surface of the anode active material such as graphite.

The SEI layer functions as an ion tunnel, allowing only lithium ions to pass through. As an effect of such an ion tunnel, the SEI layer prevents the molecule of an organic solvent having large molecular weight, which is included in the electrolyte solution and transferred together with lithium ions, from being inserted between the layers of the anode active material to destroy the structure of the anode. As a result, direct contact of the electrolyte solution with the anode active material is prohibited to prevent the decomposition of the electrolyte solution and reversibly maintains the amount of lithium ions present in the electrolyte solution, thereby allowing a stable charging/discharging.

However, during the formation of the SEI layer, the carbonate-based organic solvent may decompose to generate a gas such as CO, $CO_2$, $CH_4$ and $C_2H_6$, which may cause the battery being charged to swell in thickness. Also, when a battery is left at a high temperature in a fully charged state, the SEI layer may be slowly broken down due to increased electrochemical energy and thermal energy over time, thereby causing continuous side reactions between the surface of the anode and the surrounding electrolyte solution and continuously generating gas. As a result, the inner pressure of the battery may be increased, thereby increasing the thickness of the battery to cause performance problems to electronics such as cellular phones and notebook computers equipped with a prismatic- or pouch-shape battery. Thus, the SEI layer has poor stability at a high temperature. In addition, in conventional lithium secondary batteries comprising a large amount of ethylene carbonate, the unstableness of the SEI layer may intensify the inner pressure increase problem of the battery. Furthermore, ethylene carbonate has a high freezing point (37 to 39° C.) and maintains a solid state at room temperature to have low ionic conductivity at a low temperature. Accordingly, a lithium battery using a non-aqueous solvent containing a large amount of ethylene carbonate has a poor conductivity at a low temperature.

In order to overcome such a problem, attempt has been made to vary the composition of a carbonate-based organic solvent or mix the solvent with a certain additive to change a SEI layer-forming reaction. However, it is known that the variation of a solvent composition or the addition of a certain compound may improve some performances of a battery, but may also deteriorate any other properties thereof.

Accordingly, there is a need to develop a composition of a non-aqueous electrolyte solution capable of providing a lithium battery having superior characteristics in terms of life cycle, low and high temperature discharging, as well as high-rate charging/discharging characteristic.

DISCLOSURE

Technical Problem

The present invention is designed to solve the problems of the prior art, and therefore it is an object of the present invention to provide a non-aqueous electrolyte solution for a lithium secondary battery having an improved life cycle at room temperature and a high temperature, and a lithium secondary battery comprising the non-aqueous electrolyte solution.

Technical Solution

In order to accomplish the above object, in accordance with one aspect of the present invention, there is provided a non-aqueous electrolyte solution for a lithium secondary battery, comprising an electrolyte salt and an organic solvent, wherein the non-aqueous electrolyte solution further comprises an ester-based compound having the following formula (I), and the amount of the ester-based compound is in the range of 50 to 90 vol % based on the total volume of the organic solvent and the ester-based compound:

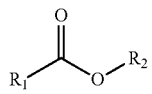

(I)

wherein, $R_1$ and $R_2$ are each independently a substituted or unsubstituted alkyl group having 1 to 10 carbon atoms, where at least one of $R_1$ and $R_2$ is a substituted or unsubstituted branched-chain alkyl group having 3 to 10 carbon atoms.

In accordance with another aspect of the present invention, there is provided a lithium secondary battery comprising a cathode, an anode and a non-aqueous electrolyte solution, wherein the non-aqueous electrolyte solution is the above-mentioned non-aqueous electrolyte solution for a lithium secondary battery.

Advantageous Effects

The non-aqueous electrolyte solution according to one aspect of the present invention, which comprises an ester-based compound having a branched-chain alkyl group, is used in a lithium secondary battery to minimize the capacity decrease and thickness change of the battery and provide a markedly improved life characteristics and stability even if charging/discharging cycles are repeated several hundred times at room temperature and a high temperature, as compared to a lithium battery using a non-aqueous electrolyte solution having only an ester-based compound having a straight-chain alkyl group.

DESCRIPTION OF DRAWINGS

Other objects and aspects of the present invention will become apparent from the following descriptions of the embodiments with reference to the accompanying drawings in which.

BEST MODE

Figure 1:
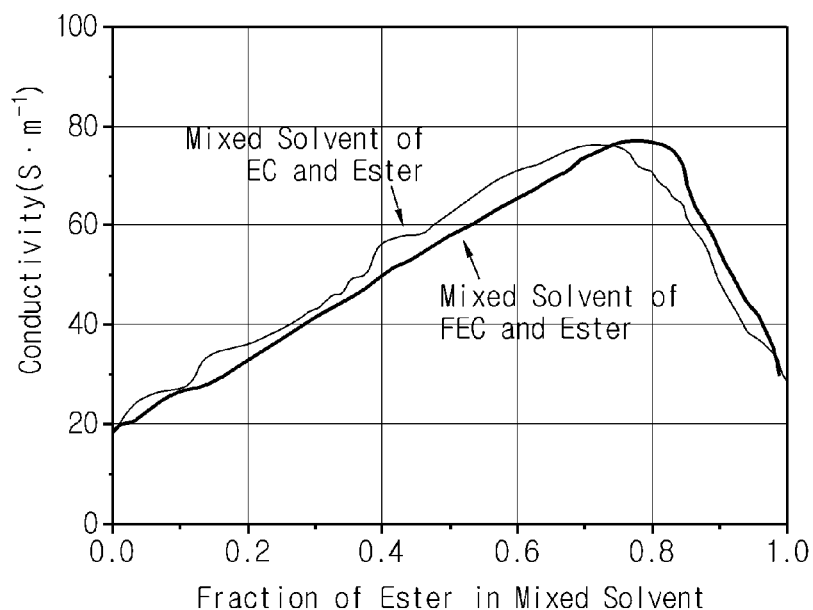
FIG. 1 shows the change of an ionic conductivity of a mixed solvent depending on the fraction of an ester compound to ethylene carbonate or fluoroethylene carbonate in the mixed solvent.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The non-aqueous electrolyte solution for a lithium secondary battery according to one aspect of the present invention comprises an electrolyte salt and an organic solvent, and further comprises an ester-based compound having the following formula (I), the amount of the ester-based compound is in the range of 50 to 90 vol % based on the total volume of the organic solvent and the ester-based compound:

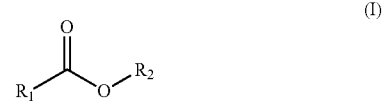

(I)

wherein, $R_1$ and $R_2$ are each independently a substituted or unsubstituted alkyl group having 1 to 10 carbon atoms, where at least one of $R_1$ and $R_2$ is a substituted or unsubstituted branched-chain alkyl group having 3 to 10 carbon atoms.

In a secondary battery in which a non-aqueous electrolyte solution is introduced, an anode is subject to rapid shrinking-swelling as the charging/discharging cycles of the battery are repeated, at which an SEI layer is destroyed due to the anode swelling during charging, and the electrolyte solution decomposes to form a new SEI layer. From this phenomenon, the electrolyte is gradually depleted to exhaust lithium ions present in the electrolyte solution as the cycles proceed, thereby decreasing the capacity of the battery. Such a depletion of the electrolyte is deemed to occur mainly in a cyclic carbonate included in a solvent. For example, from the life test of a secondary battery, when the battery is disassembled and examined at the time in which the life of the battery rapidly decreases, it was concluded that fluoroethylene carbonate (FEC) being a cyclic carbonate was completely depleted.

Meanwhile, in the non-aqueous electrolyte solution according to one aspect of the present invention, the ester-based compound essentially has a branched-chain $C_{3-10}$ alkyl group which is bonded with at least one of the oxygen atom and carbonyl group thereof, thereby being capable of easily producing a radical as compared to an ester compound having only a straight-chain alkyl group. Accordingly, the ester-based compound having the branched-chain alkyl group can produce a radical instead of a cyclic carbonate to inhibit the decomposition of the cyclic carbonate in the electrolyte solution, thereby maintaining the capacity of a secondary battery for a long period.

In the above compound, $R_1$ and $R_2$ may be each independently a substituted or unsubstituted alkyl group having 1 to 8 carbon atoms, where at least one of $R_1$ and $R_2$ is a substituted or unsubstituted branched-chain alkyl group having 3 to 8 carbon atoms. Also, $R_1$ and $R_2$ may be each independently a substituted or unsubstituted alkyl group having 1 to 6 carbon atoms, where at least one of $R_1$ and $R_2$ is a substituted or unsubstituted isoalkyl group having 3 to 6 carbon atoms, substituted or unsubstituted sec-alkyl group having 4 to 6 carbon atoms, or substituted or unsubstituted tert-alkyl group having 4 to 6 carbon atoms.

Specifically, $R_1$ may be methyl, ethyl or propyl, and $R_2$ may be isopropyl, isobutyl, isopentyl, isohexyl, sec-butyl, sec-pentyl, tert-butyl or tert-pentyl. Also, $R_1$ may be isopropyl, isobutyl, isopentyl, isohexyl, sec-butyl, sec-pentyl, tert-butyl or tert-pentyl, and $R_2$ may be methyl, ethyl or propyl. Also, $R_1$ and $R_2$ may be each independently isopropyl, isobutyl, isopentyl, isohexyl, sec-butyl, sec-pentyl, tert-butyl or tert-pentyl.

Non-limiting examples of the ester-based compound may include at least one selected from the group consisting of isobutyl propionate, isobutyl butylate, isoamyl propionate, ethyl 2-methyl butylate, ethyl isovalerate, ethyl isobutylate, methyl 2-methyl butyrate, methyl isovalerate, methyl isobutylate, propyl-2-methyl butylate, propyl isovalerate and propyl isobutylate.

The amount of the ester-based compound may be in the range of 50 to 90 vol %, preferably 60 to 80 vol %, based on the total volume of a non-aqueous solvent and the ester-based compound.

When the amount of the ester-based compound satisfies the above range, ionic conductivity increases to accomplish good battery performances in terms of various aspects.

Such an amount range of the ester-based compound may be derived with reference to FIG. 1. That is, FIG. 1 shows the change of an ionic conductivity of a mixed solvent, measured depending on the fraction of an ester compound to ethylene carbonate which is mainly used as a cyclic carbonate or fluoroethylene carbonate in the mixed solvent. At this time, 1M $LiPF_6$ is used as an electrolyte salt. Referring to FIG. 1, when an ester fraction is too low, the viscosity of the mixed solvent is high, while when an ester fraction is too high, the solubility of the electrolyte salt and the dielectric constant of the electrolyte solution decrease. Accordingly, the amount of the ester compound may be in the range of 50 to 90 vol %, preferably 60 to 80 vol %.

As mentioned above, $R_1$ and $R_2$ may be substituted, specifically, at least one hydrogen atom contained in the alkyl group of $R_1$ and $R_2$ may be optionally substituted with halogen, cyano, hydroxyl, nitro or amino (such as —$NH_2$, —NH(R) and —N(R')(R''), wherein R' and R'' are each independently $C_{1-10}$ alkyl), $C_{1-12}$ alkyl, halogenated $C_{1-12}$ alkyl, $C_{2-12}$ alkenyl, $C_{2-12}$ alkynyl or $C_{6-12}$ aryl.

The non-aqueous electrolyte solution according to one aspect of the present invention comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^{-1}$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution comprises an organic solvent which is conventionally used in an electrolyte solution for a lithium secondary battery, for example, an ether, an ester, an amide, a linear carbonate, a cyclic carbonate or a mixture thereof.

Among these, a linear carbonate, a cyclic carbonate, or a mixture thereof is representatively used.

The cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof, or a mixture thereof.

The halide of the cyclic carbonate may be a compound having the following formula (II):

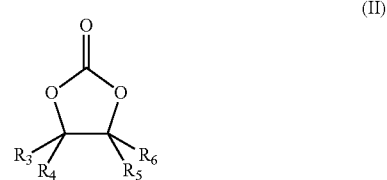

(II)

wherein, $R_3$ to $R_6$ are each independently hydrogen, or substituted or unsubstituted $C_{1-10}$ alkyl, where hydrogen contained in at least one of $R_3$ to $R_6$ is substituted with halogen. An example of the halogen includes Cl and F.

Exemplary halides of the cyclic carbonate include fluoroethylene carbonate (FEC), 1,2-difluoroethylene carbonate, chloroethylene carbonate and 1,2-dichloroethylene carbonate, but are not limited thereto.

The linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The non-aqueous electrolyte solution for a lithium secondary battery according to one aspect of the present invention may further comprise an SEI layer-forming additive within a range which does not deviate from the object of the present invention. The SEI layer-forming additive which may be used in the present invention includes a cyclic sulfite, a saturated sultone, an unsaturated sultone, a non-cyclic sulfone and a mixture thereof, but is not limited thereto. Among the cyclic carbonates mentioned above, vinylene carbonate and vinyl ethylene carbonate may also be used as the SEI layer-forming additive to improve the life of a battery.

Examples of the cyclic sulfite include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite; examples of the saturated sultone include 1,3-propane sultone and 1,4-butane sultone; examples of the unsaturated sultone include ethene sultone, 1,3-propene sultone, 1,4-butene sultone and 1-methyl-1,3-propene sultone; and examples of the non-cyclic sulfone include divinyl sulfone, dimethyl sulfone, diethyl sulfone, methyl ethyl sulfone and methyl vinyl sulfone.

The SEI layer-forming additive may be used in a suitable amount depending on its specific type, for example, in an amount of 0.01 to 10 parts by weights based on 100 parts by weight of the non-aqueous electrolyte solution.

The non-aqueous electrolyte solution may be instantly used as a liquid electrolyte or immersed in a polymer and then used in the form of a gel polymer electrolyte in a lithium secondary battery.

The non-aqueous electrolyte solution according to one aspect of the present invention may be prepared by adding the electrolyte salt to the non-aqueous solvent and dissolving the ester-based compound therein in an amount of 50 to 90 vol % based on the total volume of the non-aqueous solvent and the ester-based compound.

At this time, the compounds being added to the non-aqueous solvent and electrolyte solution are subject to pre-purification before using within a range which will not substantially deteriorate productivity, so as to have little or no impurity.

In the non-aqueous electrolyte solution, air or carbon dioxide may be added to improve battery characteristics including the inhibition of gas generation by electrolyte solution decomposition, cycle characteristics over a long period and charging-preservation characteristics.

In order to improve charging/discharging characteristics, carbon dioxide may be used by dissolving in the non-aqueous electrolyte solution. The carbon dioxide may be dissolved in an amount of 0.001 wt % or more, preferably 0.05 wt % or more, more preferably 0.2 wt % or more, most preferably until the carbon dioxide is saturated in the non-aqueous electrolyte solution.

Further, in accordance with the present invention, there is provided a lithium secondary battery comprising an electrode assembly consisting of a cathode, an anode and a separator interposed therebetween, and a non-aqueous electrolyte solution introduced in the electrode assembly, wherein the non-aqueous electrolyte solution is the above-mentioned non-aqueous electrolyte solution for a lithium secondary battery.

The cathode, anode and separator composing the electrode assembly may be any one which is conventionally used in the preparation of a lithium secondary battery.

The cathode has a structure wherein a cathode layer comprising a cathode active material, a conductive material and a binder is immersed in one side or both sides of a current collector.

As the cathode active material, a lithium-containing transition metal oxide may be preferably used, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $LixFePO_4$ (0.5<x<1.3) and a mixture thereof may be used. The lithium-containing transition metal oxide may be coated with a metal such as aluminum (Al) and a metal oxide. In addition, lithium-containing transition metal sulfide, selenide, or halide may also be used.

As the conductive material, any electron-conductive material is not particularly limited if it does not cause a chemical change in an electrochemical device. Generally, carbon black, graphite, carbon fiber, carbon nanotube, metal powders, a conductive metal oxide and an organic conductive material may be used. Examples of a commercially available conductive material include acetylene black-based products (Chevron Chemical Company or Gulf Oil Company), Ketjen Black EC-based products (Armak Company, Vulcan XC-72 (Cabot Company) and Super P (MMM Carbon Company). For example, acetylene black, carbon black and graphite may be used.

The anode has a structure wherein an anode layer comprising an anode active material and a binder is immersed in one side or both sides of a current collector.

As the anode active material, a carbon-based material, lithium metal, a metal compound or a mixture thereof which can conventionally intercalate and disintercalate lithium ions may be used.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $SiO$, $TiO_2$ and $SnO_2$), a nitride, a sulfide, a boride, an alloy with lithium and any other form, and among these, forms such as a combination, an alloy, an oxide and an alloy with lithium can provide the high capacity of a battery. In particular, a compound containing at least one metal selected from Si, Ge and Sn, preferably Si and Sn can provide even higher capacity of a battery.

As the anode active material, a mixture of the metal compound and the carbon material may be used, for example, in a weight ratio of 1:99 to 40:60, preferably 3:97 to 33:67, more preferably 5:95 to 20:80. When the weight ratio of the metal compound and the carbon material is within the above range, it is possible to minimize the reduction of an electrical conductivity which may occur when using one metal compound alone and a crack occurring in the active material due to volume swelling and improve a capacity of the anode active material, thereby providing good electrochemical characteristics in an electrochemical device to which such a mixture of the metal compound and the carbon material is applied.

The binder used in the cathode and anode functions to maintain cathode and anode active materials in a current collector and connect active materials with each other, and may be any one which is conventionally used.

For example, various kinds of binder polymers including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for about 2 hours.

Also, the cathode has a layer thickness (per one side of a current collector) of 30 to 120 μm, preferably 50 to 100 μm, and the anode has a layer thickness of 1 to 100 μm, preferably 3 to 70 μm. When the cathode and the anode satisfies such a thickness range, a sufficient amount of an active material is provided in the layer of an electrode material to prevent a battery capacity from being lowered and improve cycle and rate characteristics.

The separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melting point or polyethylene terephthalate fiber may be used, but is not limited thereto.

The lithium secondary battery of the present invention is not limited to its shape, but may be a cylindrical shape using a can, a prismatic shape, a pouch shape or a coin shape.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

Preparation of Non-Aqueous Electrolyte Solution (I)

Example 1-1

Fluoroethylene carbonate (FEC) and isobutyl propionate were mixed in a ratio of 20 vol % and 80 vol %, respectively, to obtain a mixture. Therein, $LiPF_6$ was dissolved until 1M $LiPF_6$ solution was obtained, to prepare a non-aqueous electrolyte solution.

Example 1-2

The procedure of Example 1-1 was repeated except that isoamyl propionate was used instead of isobutyl propionate, to prepare a non-aqueous electrolyte solution.

Example 1-3

The procedure of Example 1-1 was repeated, and then 3 parts by weight of vinylene carbonate was added based on 100 parts by weight of the non-aqueous electrolyte solution prepared in Example 1-1, to prepare a non-aqueous electrolyte solution.

Example 1-4

The procedure of Example 1-2 w as repeated, and then 3 parts by weight of vinylene carbonate was added based on 100 parts by weight of the non-aqueous electrolyte solution prepared in Example 1-2, to prepare a non-aqueous electrolyte solution.

Example 1-5

Fluoroethylene carbonate (FEC) and isobutyl propionate were mixed in a ratio of 30 vol % and 70 vol %, respectively, to which 3 parts by weight of 1,3-propene-sultone and 3 parts by weight of 1,3-propane sultone were added based on 100 parts by weight of the resulting mixture of FEC and isobutyl propionate, to obtain a mixture. Therein, $LiPF_6$ was dissolved until 1M $LiPF_6$ solution is obtained, to prepare a non-aqueous electrolyte solution.

Example 1-6

The procedure of Example 1-5 was repeated except that isoamyl propionate was used instead of isobutyl propionate, to prepare a non-aqueous electrolyte solution.

Comparative Example 1-1

The procedure of Example 1-1 was repeated except that n-butyl propionate was used instead of isobutyl propionate, to prepare a non-aqueous electrolyte solution.

Comparative Example 1-2

The procedure of Example 1-1 was repeated except that n-pentyl propionate was used instead of isobutyl propionate, to prepare a non-aqueous electrolyte solution.

Comparative Example 1-3

The procedure of Example 1-1 was repeated except that n-hexyl propionate was used instead of isobutyl propionate, to prepare a non-aqueous electrolyte solution.

Comparative Example 1-4

The procedure of Comparative Example 1-1 was repeated, and then 3 parts by weight of vinylene carbonate was added based on 100 parts by weight of the non-aqueous electrolyte solution prepared in Comparative Example 1-1, to prepare a non-aqueous electrolyte solution.

Comparative Example 1-5

The procedure of Comparative Example 1-2 was repeated, and then 3 parts by weight of vinylene carbonate was added based on 100 parts by weight of the non-aqueous electrolyte solution prepared in Comparative Example 1-2, to prepare a non-aqueous electrolyte solution.

Comparative Example 1-6

The procedure of Comparative Example 1-3 was repeated, and then 3 parts by weight of vinylene carbonate was added based on 100 parts by weight of the non-aqueous electrolyte solution prepared in Comparative Example 1-3, to prepare a non-aqueous electrolyte solution.

Comparative Example 1-7

The procedure of Example 1-1 was repeated except that ethyl propionate was used instead of isobutyl propionate, to prepare a non-aqueous electrolyte solution.

Comparative Example 1-8

The procedure of Example 1-5 was repeated except that n-butyl propionate was used instead of isobutyl propionate, to prepare a non-aqueous electrolyte solution.

Comparative Example 1-9

The procedure of Example 1-5 was repeated except that ethyl propionate was used instead of isobutyl propionate, to prepare a non-aqueous electrolyte solution.

Comparative Example 1-10

Fluoroethylene carbonate (FEC) and isoamyl propionate were mixed in a ratio of 60 vol % and 40 vol %, respectively, to obtain a mixture. Therein, $LiPF_6$ was dissolved until 1M $LiPF_6$ solution was obtained, to prepare a non-aqueous electrolyte solution.

Comparative Example 1-11

Fluoroethylene carbonate (FEC), dimethyl carbonate (DMC) and isoamyl propionate were mixed in a ratio of 30 vol %, 30 vol % and 40 vol %, respectively, to obtain a mixture. Therein, $LiPF_6$ was dissolved until 1M $LiPF_6$ solution was obtained, to prepare a non-aqueous electrolyte solution.

Preparation of Lithium Secondary Battery (I)

Example 2-1

$LiCoO_2$ as a cathode and an Si oxide (prepared by blending 10 wt % of SiO and 90 wt % of graphite and adding a non-aqueous binder thereto) as an anode were used to obtain electrodes, in which the non-aqueous electrolyte solution prepared in Example 1-1 was introduced, according to a conventional method known in the art, to prepare a lithium secondary battery.

Example 2-2

The procedure of Example 2-1 was repeated except that the non-aqueous electrolyte solution prepared in Example 1-2 was used, to prepare a lithium secondary battery.

Example 2-3

The procedure of Example 2-1 was repeated except that the non-aqueous electrolyte solution prepared in Example 1-3 was used, to prepare a lithium secondary battery.

Example 2-4

The procedure of Example 2-1 was repeated except that the non-aqueous electrolyte solution prepared in Example 1-4 was used, to prepare a lithium secondary battery.

Example 2-5

The procedure of Example 2-1 was repeated except that artificial graphite was used as an anode and the non-aqueous electrolyte solution prepared in Example 1-5 was used, to prepare a lithium secondary battery.

Example 2-6

The procedure of Example 2-1 was repeated except that artificial graphite was used as an anode and the non-aqueous electrolyte solution prepared in Example 1-6 was used, to prepare a lithium secondary battery.

Comparative Example 2-1

The procedure of Example 2-1 was repeated except that the non-aqueous electrolyte solution prepared in Comparative Example 1-1 was used, to prepare a lithium secondary battery.

Comparative Example 2-2

The procedure of Example 2-1 was repeated except that the non-aqueous electrolyte solution prepared in Comparative Example 1-2 was used, to prepare a lithium secondary battery.

Comparative Example 2-3

The procedure of Example 2-1 was repeated except that the non-aqueous electrolyte solution prepared in Comparative Example 1-3 was used, to prepare a lithium secondary battery.

Comparative Example 2-4

The procedure of Example 2-1 was repeated except that the non-aqueous electrolyte solution prepared in Comparative Example 1-4 was used, to prepare a lithium secondary battery.

Comparative Example 2-5

The procedure of Example 2-1 was repeated except that the non-aqueous electrolyte solution prepared in Comparative Example 1-5 was used, to prepare a lithium secondary battery.

Comparative Example 2-6

The procedure of Example 2-1 was repeated except that the non-aqueous electrolyte solution prepared in Comparative Example 1-6 was used, to prepare a lithium secondary battery.

Comparative Example 2-7

The procedure of Example 2-1 was repeated except that the non-aqueous electrolyte solution prepared in Comparative Example 1-7 was used, to prepare a lithium secondary battery.

Comparative Example 2-8

The procedure of Comparative Example 2-1 was repeated except that artificial graphite was used as an anode and the non-aqueous electrolyte solution prepared in Comparative Example 1-8 was used, to prepare a lithium secondary battery.

Comparative Example 2-9

The procedure of Comparative Example 2-1 was repeated except that artificial graphite was used as an anode and the non-aqueous electrolyte solution prepared in Comparative Example 1-9 was used, to prepare a lithium secondary battery.

Comparative Example 2-10

The procedure of Comparative Example 2-1 was repeated except that the non-aqueous electrolyte solution prepared in Comparative Example 1-10 was used, to prepare a lithium secondary battery.

Comparative Example 2-11

The procedure of Comparative Example 2-1 was repeated except that the non-aqueous electrolyte solution prepared in Comparative Example 1-11 was used, to prepare a lithium secondary battery.

Evaluation of Lithium Secondary Battery Characteristics (I)

Life Characteristics at Room Temperature (1)

Figure 2:
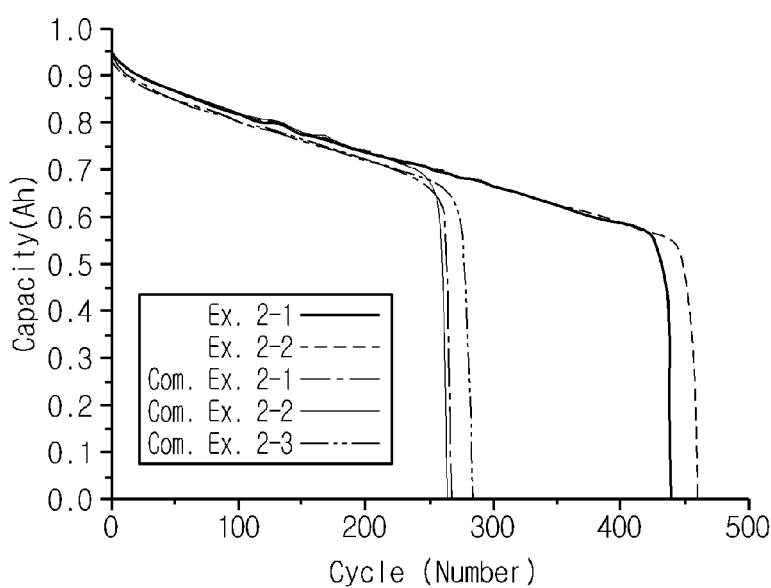
FIG. 2 shows the room temperature life characteristics of lithium batteries prepared in Examples 2-1 and 2-2 and Comparative Examples 2-1 to 2-3.

Lithium secondary batteries (Capacity: 950 mAh) prepared in Examples 2-1 and 2-2 and Comparative Examples 2-1 to 2-3 were charged at 23° C. with a constant current of 0.5 C up to 4.35 V and then with a constant voltage of 4.35 V, and the charging process was completed when the charging current reached 50 mA. After left for 10 minutes, the batteries were discharged with a constant current of 0.5 C up to 2.5 V. The charging/discharging was repeated 500 times under the same conditions, and then the capacity of the batteries were measured and shown in FIG. 2. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95 A.

Life Characteristics at Room Temperature (2)

Figure 3:
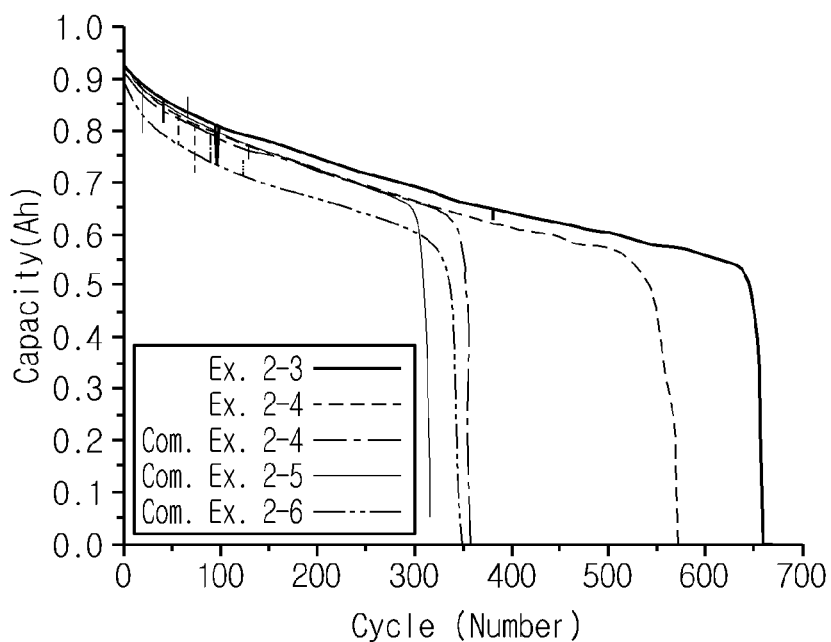
FIG. 3 shows the room temperature life characteristics of lithium batteries prepared in Examples 2-3 and 2-4 and Comparative Examples 2-4 to 2-6.

Lithium secondary batteries (Capacity: 950 mAh) prepared in Examples 2-3 and 2-4 and Comparative Examples 2-4 to 2-6 were charged at 23° C. with a constant current of 0.5 C up to 4.35 V and then with a constant voltage of 4.35 V, and the charging process was completed when the charging current reached 50 mA. After left for 10 minutes, the batteries were discharged with a constant current of 0.5 C up to 2.5 V. The charging/discharging was repeated 700 times under the same conditions, and then the capacity of the batteries were measured and shown in FIG. 3. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95 A.

Life Characteristics at Room Temperature (3)

Figure 4:
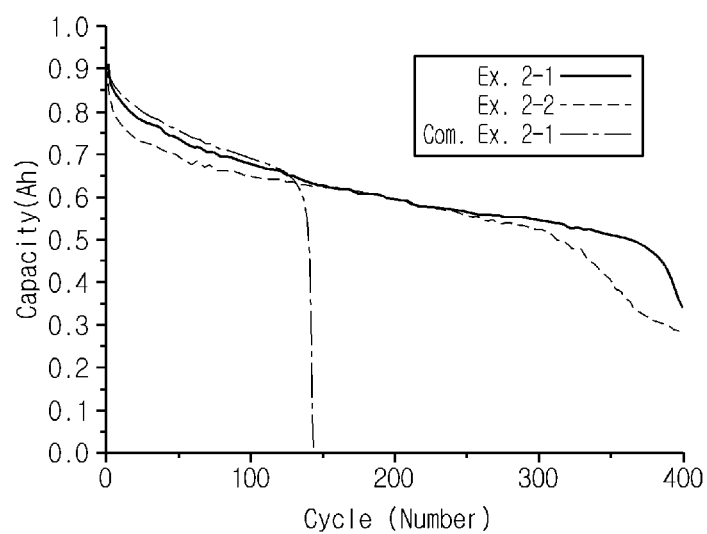
FIG. 4 shows the room temperature life characteristics of lithium batteries prepared in Examples 2-1 and 2-2 and Comparative Example 2-1.

Lithium secondary batteries (Capacity: 950 mAh) prepared in Examples 2-1 and 2-2 and Comparative Example 2-1 were charged at 23° C. with a constant current of 1.0 C up to 4.35 V and then with a constant voltage of 4.35 V, and the charging process was completed when the charging current reached 50 mA. After left for 10 minutes, the batteries were discharged with a constant current of 1.0 C up to 2.5 V. The charging/discharging was repeated 400 times under the same conditions, and then the capacity of the batteries were measured and shown in FIG. 4. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95 A.

Life Characteristics at a High Temperature (1)

Figure 5:
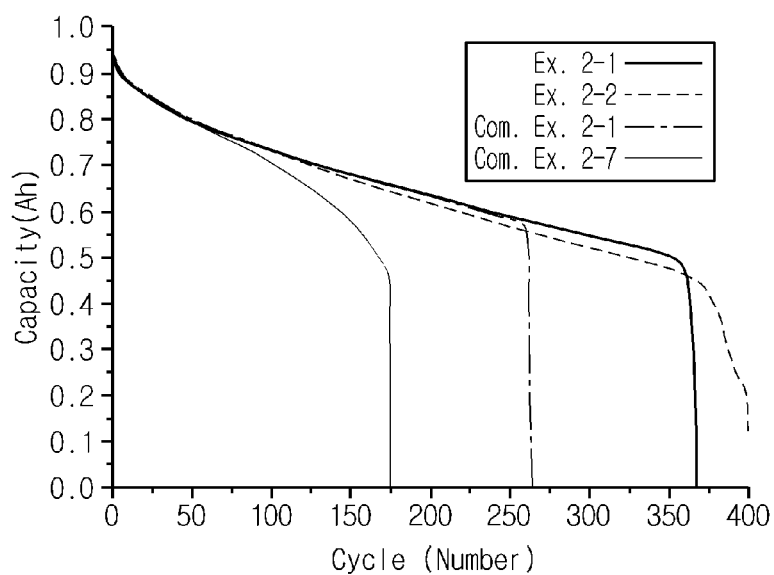
FIG. 5 shows the high-temperature life characteristics of lithium batteries prepared in Examples 2-1 and 2-2 and Comparative Examples 2-1 and 2-7.

Lithium secondary batteries (Capacity: 950 mAh) prepared in Examples 2-1 and 2-2 and Comparative Examples 2-1 and 2-7 were charged at 45° C. with a constant current of 1.0 C up to 4.35 V and then with a constant voltage of 4.35 V, and the charging process was completed when the charging current reached 50 mA. After left for 10 minutes, the batteries were discharged with a constant current of 1.0 C up to 2.5 V. The charging/discharging was repeated 400 times under the same conditions, and then the capacity of the batteries were measured and shown in FIG. 5. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95 A.

Life Characteristics at a High Temperature (2)

Figure 6:
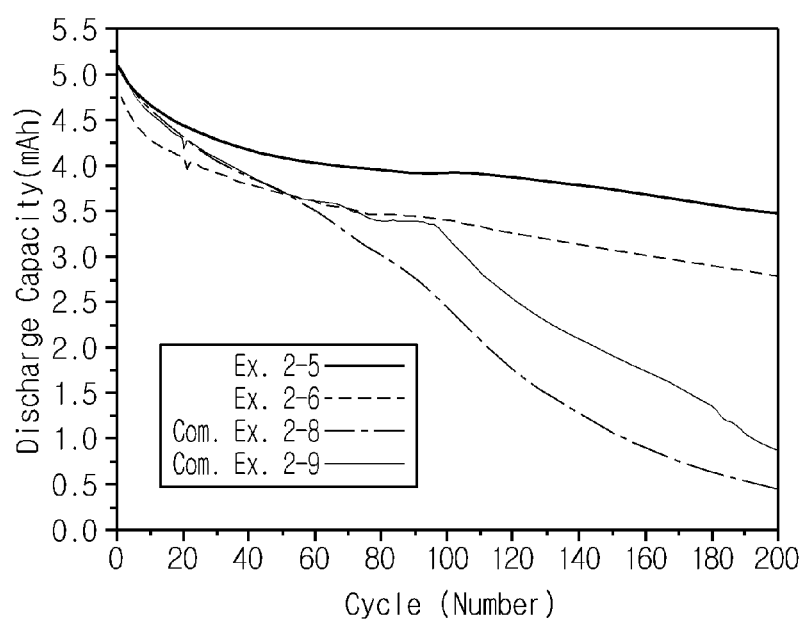
FIG. 6 shows the high-temperature life characteristics of lithium batteries prepared in Examples 2-5 and 2-6 and Comparative Examples 2-8 and 2-9.

Lithium secondary batteries (Capacity: 5.5 mAh) prepared in Examples 2-5 and 2-6 and Comparative Examples 2-8 and 2-9 were charged at 55° C. with a constant current of 0.7 C up to 4.35 V and then with a constant voltage of 4.35 V, and the charging process was completed when the charging current reached 0.275 mA. After left for 10 minutes, the batteries were discharged with a constant current of 0.5 C up to 3.0 V. The charging/discharging was repeated 200 times under the same conditions, and then the capacity of the batteries were measured and shown in FIG. 6. The unit "C" which is used herein refers to a charging/discharging current rate (C-rate) of a battery, represented by ampere (A), and is usually expressed by a percentage of the battery capacity. Accordingly, "1C" of the batteries prepared above means a current of 5.5 mA.

Life Characteristics and Thickness Variation

Lithium secondary batteries (Capacity: 950 mAh) prepared in Examples 2-1 and 2-2 and Comparative Examples 2-1, 2-10 and 2-11 were charged at 23° C. with a constant current of 0.5 C up to 4.35 V and then with a constant voltage of 4.35 V, and the charging process was completed when the charging current reached 50 mA. After left for 10 minutes, the batteries were discharged with a constant current of 0.5 C up to 2.5 V. The charging/discharging was repeated 500 times under the same conditions, and then the capacity and thickness of the batteries were measured and shown in FIGS. 7 and 8, respectively. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95A.

Figure 7:
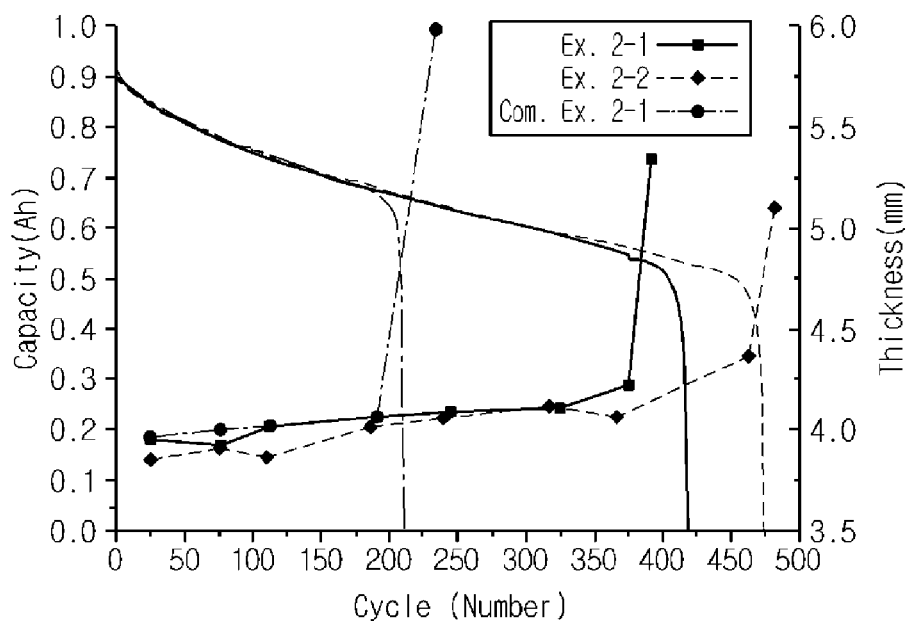
FIG. 7 shows the life characteristics and thickness variation of lithium batteries prepared in Examples 2-1 and 2-2 and Comparative Example 2-1.
Figure 8:
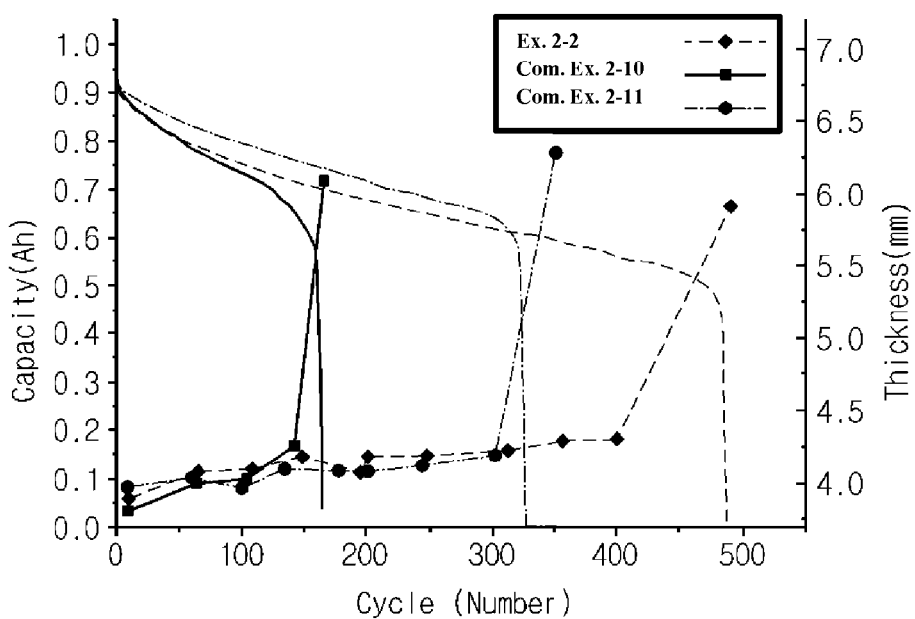
FIG. 8 shows the life characteristics and thickness variation of lithium batteries prepared in Examples 2-2 and Comparative Examples 2-10 and 2-11.

In FIGS. 7 and 8, the upper graph shows the capacity variation of the batteries, and the lower graph, the thickness variation thereof.

As can be seen from FIGS. 2 to 8, lithium secondary batteries using the electrolyte solution comprising an ester-based compound which has a branched-chain alkyl group, such as isobutyl propionate and isoamyl propionate, in an amount of 50 to 90 vol % based on the total volume of an organic solvent and the ester-based compound exhibit superior life characteristics at both room temperature and a high temperature, as well as very low thickness variation, as compared to lithium secondary batteries using the electrolyte solution comprising an ester-based compound having a straight-chain alkyl group or using the electrolyte solution comprising an ester-based compound having a branched-chain alkyl group in an amount of departing from such range.

Preparation of Non-Aqueous Electrolyte Solution (II)

Example 3-1

Fluoroethylene carbonate (FEC) and ethyl 2-methyl butylate were mixed in a ratio of 20 vol % and 80 vol %, respectively, to obtain a mixture. Therein, $LiPF_6$ was dissolved until 1M $LiPF_6$ solution was obtained, to prepare a non-aqueous electrolyte solution.

Example 3-2

The procedure of Example 3-1 was repeated except that ethyl isovalerate was used instead of ethyl 2-methyl butylate, to prepare a non-aqueous electrolyte solution.

Example 3-3

The procedure of Example 3-1 was repeated except that ethyl isobutylate was used instead of ethyl 2-methyl butylate, to prepare a non-aqueous electrolyte solution.

Example 3-4

Fluoroethylene carbonate (FEC) and ethyl 2-methyl butylate were mixed in a ratio of 30 vol % and 70 vol %, respectively, to which 3 parts by weight of 1,3-propenesultone and 3 parts by weight of 1,3-propane sultone were added based on 100 parts by weight of the resulting mixture of FEC and ethyl 2-methyl butylate, to obtain a mixture. Therein, $LiPF_6$ was dissolved until 1M $LiPF_6$ solution was obtained, to prepare a non-aqueous electrolyte solution.

Example 3-5

The procedure of Example 3-4 was repeated except that ethyl isovalerate was used instead of ethyl 2-methyl butylate, to prepare a non-aqueous electrolyte solution.

Comparative Example 3-1

The procedure of Example 3-1 was repeated except that ethyl valerate was used instead of ethyl 2-methyl butylate, to prepare a non-aqueous electrolyte solution.

Comparative Example 3-2

The procedure of Example 3-1 was repeated except that ethyl butylate was used instead of ethyl 2-methyl butylate, to prepare a non-aqueous electrolyte solution.

Comparative Example 3-3

The procedure of Example 3-4 was repeated except that ethyl valerate was used instead of ethyl 2-methyl butylate, to prepare a non-aqueous electrolyte solution.

Comparative Example 3-4

The procedure of Example 3-4 was repeated except that ethyl butylate was used instead of ethyl 2-methyl butylate, to prepare a non-aqueous electrolyte solution.

Comparative Example 3-5

Fluoroethylene carbonate (FEC) and ethyl 2-methyl butylate were mixed in a ratio of 60 vol % and 40 vol %, respectively, to obtain a mixture. Therein, $LiPF_6$ was dissolved until 1M $LiPF_6$ solution was obtained, to prepare a non-aqueous electrolyte solution.

Comparative Example 3-6

Fluoroethylene carbonate (FEC), dimethyl carbonate (DMC) and ethyl 2-methyl butylate were mixed in a ratio of 30 vol %, 30 vol % and 40 vol %, respectively, to obtain a mixture. Therein, $LiPF_6$ was dissolved until 1M $LiPF_6$ solution was obtained, to prepare a non-aqueous electrolyte solution.

Preparation of Lithium Secondary Battery (II)

Example 4-1

$LiCoO_2$ as a cathode and an Si oxide (prepared by blending 10 wt % of SiO and 90 wt % of graphite and adding a non-aqueous binder thereto) as an anode were used to obtain electrodes, in which the non-aqueous electrolyte solution prepared in Example 3-1 was introduced, according to a conventional method known in the art, to prepare a lithium secondary battery.

Example 4-2

The procedure of Example 4-1 was repeated except that the non-aqueous electrolyte solution prepared in Example 3-2 was used, to prepare a lithium secondary battery.

Example 4-3

The procedure of Example 4-1 was repeated except that the non-aqueous electrolyte solution prepared in Example 3-3 was used, to prepare a lithium secondary battery.

Example 4-4

The procedure of Example 4-1 was repeated except that artificial graphite was used as an anode and the non-aqueous electrolyte solution prepared in Example 3-4 was used, to prepare a lithium secondary battery.

Example 4-5

The procedure of Example 4-1 was repeated except that artificial graphite was used as an anode and the non-aqueous electrolyte solution prepared in Example 3-5 was used, to prepare a lithium secondary battery.

Comparative Example 4-1

The procedure of Example 4-1 was repeated except that the non-aqueous electrolyte solution prepared in Comparative Example 3-1 was used, to prepare a lithium secondary battery.

Comparative Example 4-2

The procedure of Example 4-1 was repeated except that the non-aqueous electrolyte solution prepared in Comparative Example 3-2 was used, to prepare a lithium secondary battery.

Comparative Example 4-3

The procedure of Example 4-1 was repeated except that artificial graphite was used as an anode and the non-aqueous electrolyte solution prepared in Comparative Example 3-3 was used, to prepare a lithium secondary battery.

Comparative Example 4-4

The procedure of Comparative Example 4-1 was repeated except that artificial graphite was used as an anode and the non-aqueous electrolyte solution prepared in Comparative Example 3-4 was used, to prepare a lithium secondary battery.

Comparative Example 4-5

The procedure of Comparative Example 4-1 was repeated except that the non-aqueous electrolyte solution prepared in Comparative Example 3-5 was used, to prepare a lithium secondary battery.

Comparative Example 4-6

The procedure of Comparative Example 4-1 was repeated except that the non-aqueous electrolyte solution prepared in Comparative Example 3-6 was used, to prepare a lithium secondary battery.

Evaluation of Lithium Secondary Battery Characteristics (II)

Life Characteristics (1)

Lithium secondary batteries (Capacity: 60 mAh) prepared in Examples 4-1 and 4-2 and Comparative Example 4-1 were charged at 23° C. with a constant current of 0.5 C up to 4.35 V and then with a constant voltage of 4.35 V, and the charging process was completed when the charging current reached 3.0 mA. After left for 10 minutes, the batteries were discharged with a constant current of 0.5 C up to 2.5 V. The charging/discharging was repeated 200 times under the same conditions, and then the capacity of the batteries were measured and shown in FIG. 9. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.06 A.

Life Characteristics (2)

Lithium secondary batteries (Capacity: 950 mAh) prepared in Example 4-3 and Comparative Example 4-2 were charged at 23° C. with a constant current of 0.5 C up to 4.35 V and then with a constant voltage of 4.35 V, and the charging process was completed when the charging current reached 50 mA. After left for 10 minutes, the batteries were discharged with a constant current of 0.5 C up to 2.5 V. The charging/discharging was repeated 400 times under the same conditions, and then the capacity of the batteries were measured and shown in FIG. 10. The unit "C" which is used herein refers to a charging/discharging current rate (C-rate) of a battery, represented by ampere (A), and is usually expressed by a percentage of the battery capacity. Accordingly, "1C" of the batteries prepared above means a current of 0.95 A.

Life Characteristics (3)

Lithium secondary batteries (Capacity: 5.5 mAh) prepared in Examples 4-4 and 4-5 and Comparative Examples 4-3 and 4-4 we re charged at 55° C. with a constant current of 0.7 C up to 4.35 V and then with a constant voltage of 4.35 V, and the charging process was completed when the charging current reached 0.275 mA. After left for 10 minutes, the batteries were discharged with a constant current of 0.5 C up to 3.0 V. The charging/discharging was repeated 100 times under the same conditions, and then the capacity of the batteries were measured and shown in FIG. 11. The unit "C" which is used herein refers to a charging/discharging current rate (C-rate) of a battery, represented by ampere (A), and is usually expressed by a percentage of the battery capacity. Accordingly, "1C" of the batteries prepared above means a current of 5.5 mA.

Life Characteristics (4)

Lithium secondary batteries (Capacity: 5.5 mAh) prepared in Example 4-4 and Comparative Examples 4-5 and 4-6 were charged at 55° C. with a constant current of 0.7 C up to 4.35 V and then with a constant voltage of 4.35 V, and the charging process was completed when the charging current reached 0.275 mA. After left for 10 minutes, the batteries were discharged with a constant current of 0.5 C up to 3.0 V. The charging/discharging was repeated 100 times under the same conditions, and then the capacity of the batteries were measured and shown in FIG. 12. The unit "C" which is used herein refers to a charging/discharging current rate (C-rate) of a battery, represented by ampere (A), and is usually expressed by a percentage of the battery capacity. Accordingly, "1C" of the batteries prepared above means a current of 5.5 mA.

Figure 9:
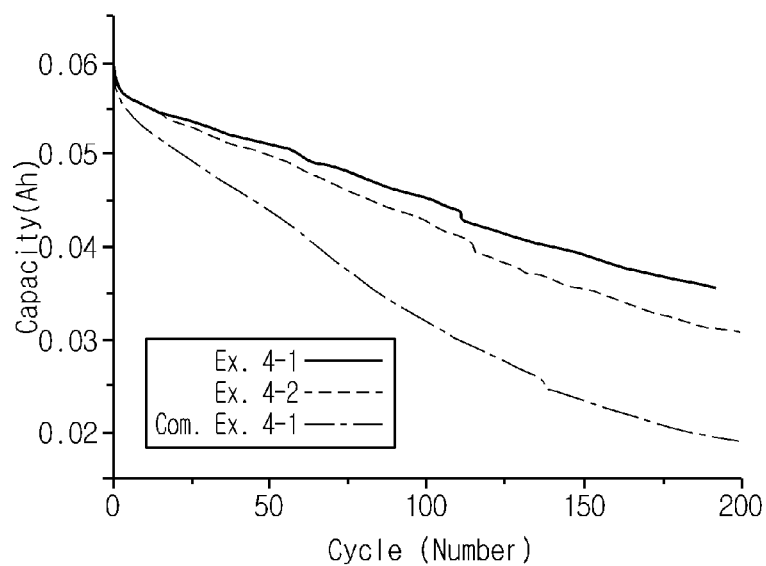
FIG. 9 shows the life characteristics of lithium batteries prepared in Examples 4-1 and 4-2 and Comparative Example 4-1.
Figure 10:
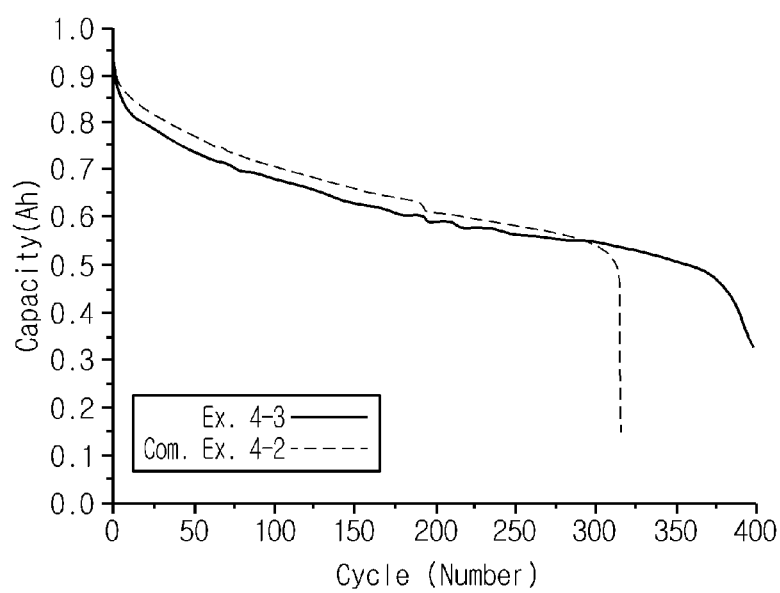
FIG. 10 shows the life characteristics of lithium batteries prepared in Example 4-3 and Comparative Example 4-2.
Figure 11:
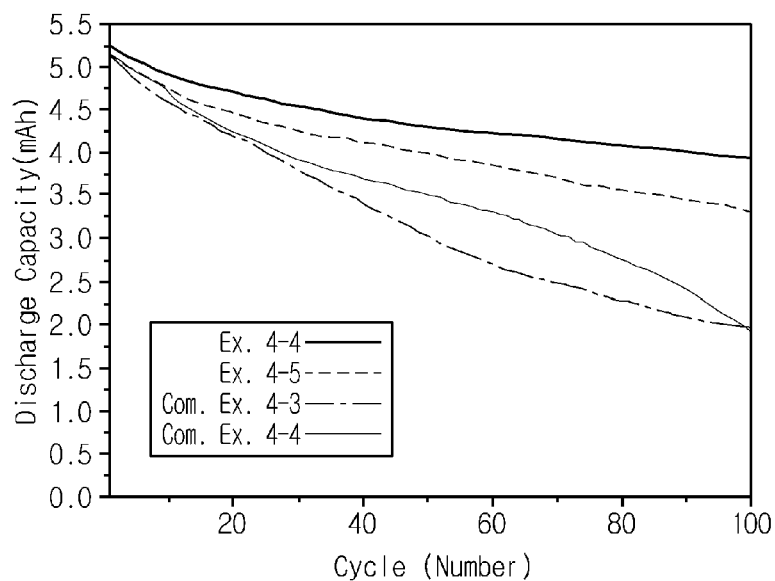
FIG. 11 shows the life characteristics of lithium batteries prepared in Examples 4-4 and 4-5 and Comparative Examples 4-3 and 4-4.

As can be seen from FIGS. 9 to 11, lithium secondary batteries using the electrolyte solution comprising a n ester-based compound in which a branched-chain alkyl group is boned on a carbonyl group, such as ethyl 2-methyl butylate, ethyl isobutylate and ethyl isobutylate, exhibit a rapid life decrease at substantially longer cycles and thus superior life characteristics, as compared to lithium secondary batteries using the electrolyte solution comprising an ester-based compound in which a straight-chain alkyl group is boned on a carbonyl group.

Figure 12:
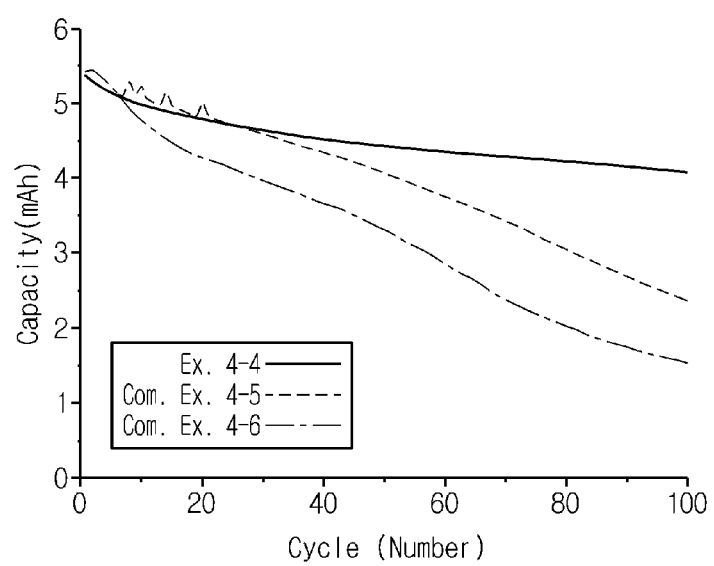
FIG. 12 shows the life characteristics of lithium batteries prepared in Example 4-4 and Comparative Examples 4-5 and 4-6.

Also, as can be seen from FIG. 12, in lithium secondary batteries using the electrolyte solution comprising an ester-based compound having a branched-chain alkyl group, when the amount of the ester-based compound used is in the range of 50 to 90 vol %, preferably 60 to 80 vol %, superior life characteristics are exhibited, as compared to the case that such a range is not satisfied.

What is claimed is:

1. A non-aqueous electrolyte solution for a lithium secondary battery, comprising
an electrolyte salt,
an organic solvent,
a cyclic carbonate, and
an ester-based compound having a branched-chain alkyl group, represented by the following formula (I), wherein the amount of the ester-based compound is in the range of 50 to 80 vol % based on the total volume of the organic solvent and the ester-based compound:

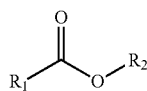
(I)

wherein,
$R_1$ is a substituted or unsubstituted alkyl group having 2 and 10 carbon atoms and
$R_2$ is a substituted or unsubstituted alkyl group having 1 to 10 carbon atoms,
where at least one of $R_1$ and $R_2$ is a substituted or unsubstituted branched-chain alkyl group having 3 to 10 carbon atoms,
wherein the ester-based compound having a branched-chain alkyl group is at least one selected from the group consisting of isobutyl propionate, isoamyl propionate, isobutyl butylate, ethyl 2-methyl butylate, ethyl isobutylate, methyl 2-methyl butyrate, methyl isovalerate, propyl-2-methyl butylate, propyl isovalerate and propyl isobutylate, and
wherein the ester-based compound inhibits the decomposition of the cyclic carbonate.

2. The non-aqueous electrolyte solution for a lithium secondary battery according to claim 1, wherein
$R_1$ is a substituted or unsubstituted alkyl group having 2 to 8 carbon atoms and
$R_2$ is a substituted or unsubstituted alkyl group having 1 to 8 carbon atoms,
where at least one of $R_1$ and $R_2$ is a substituted or unsubstituted branched-chain alkyl group having 3 to 8 carbon atoms.

3. The non-aqueous electrolyte solution for a lithium secondary battery according to claim 1, wherein
$R_1$ is a substituted or unsubstituted alkyl group having 2 to 6 carbon atoms and
$R_2$ is a substituted or unsubstituted alkyl group having 1 to 6 carbon atoms,
where at least one of $R_1$ and $R_2$ is a substituted or unsubstituted isoalkyl group having 3 to 6 carbon atoms, substituted or unsubstituted sec-alkyl group having 4 to 6 carbon atoms, or substituted or unsubstituted tert-alkyl group having 4 to 6 carbon atoms.

4. The non-aqueous electrolyte solution for a lithium secondary battery according to claim 1, wherein
$R_1$ is ethyl or propyl, and
$R_2$ is isopropyl, isobutyl, isopentyl, isohexyl, sec-butyl, sec-pentyl, tert-butyl or tert-pentyl.

5. The non-aqueous electrolyte solution for a lithium secondary battery according to claim 1, wherein
$R_1$ is isopropyl, isobutyl, isopentyl, isohexyl, sec-butyl, sec-pentyl, tert-butyl or tert-pentyl, and
$R_2$ is methyl, ethyl or propyl.

6. The non-aqueous electrolyte solution for a lithium secondary battery according to claim 1, wherein the electrolyte salt is a lithium salt.

7. The non-aqueous electrolyte solution for a lithium secondary battery according to claim 6, wherein the lithium salt has an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

8. The non-aqueous electrolyte solution for a lithium secondary battery according to claim 1, wherein the organic solvent is selected from the group consisting of a linear carbonate, an ether, an ester, an amide and a mixture thereof.

9. The non-aqueous electrolyte solution for a lithium secondary battery according to claim 8, wherein the linear carbonate is selected from the group consisting of dimethyl carbonate, diethyl carbonate, dipropyl carbonate, ethyl methyl carbonate, methyl propyl carbonate, ethyl propyl carbonate and a mixture thereof.

10. The non-aqueous electrolyte solution for a lithium secondary battery according to claim 1, wherein the cyclic carbonate compound is selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof.

11. The non-aqueous electrolyte solution for a lithium secondary battery according to claim 10, wherein the halide of the cyclic carbonate is a compound having the following formula (II):

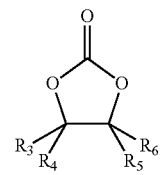
(II)

wherein,
$R_3$ to $R_6$ are each independently hydrogen, or substituted or unsubstituted $C_{1-10}$ alkyl, where hydrogen contained in at least one of $R_3$ to $R_6$ is substituted with halogen.

12. The non-aqueous electrolyte solution for a lithium secondary battery according to claim 11, wherein the halide of the cyclic carbonate is fluoroethylene carbonate.

13. The non-aqueous electrolyte solution for a lithium secondary battery according to claim 8, wherein the ether is selected from the group consisting of dimethyl ether, diethyl ether, dipropyl ether, methyl ethyl ether, methyl propyl ether, ethyl propyl ether and a mixture thereof.

14. The non-aqueous electrolyte solution for a lithium secondary battery according to claim 1, which further comprises any one selected from the group consisting of a cyclic sulfite, a saturated sultone, an unsaturated sultone, a non-cyclic sulfone and a mixture thereof.

15. A lithium secondary battery comprising an electrode assembly consisting of a cathode, an anode and a separator interposed therebetween, and a non-aqueous electrolyte solution introduced in the electrode assembly, wherein the non-aqueous electrolyte solution is the non-aqueous electrolyte solution for a lithium secondary battery according to claim 1.

16. The lithium secondary battery according to claim 15, wherein the anode has an anode active material layer comprising lithium metal, a carbon-based material, a metal compound or a mixture thereof.

17. The lithium secondary battery according to claim 15, wherein the metal compound is a compound containing at least one metal selected from the group consisting of Si, Ge, Sn, Pb, P, Sb, Bi, Al, Ga, In, Ti, Mn, Fe, Co, Ni, Cu, Zn, Ag, Mg, Sr, and Ba, or a mixture thereof.

18. The lithium secondary battery according to claim 15, wherein the cathode has a cathode layer comprising a lithium-containing oxide.

19. The lithium secondary battery according to claim 16, wherein the lithium-containing oxide is selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \le y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$ and a mixture thereof.

20. The non-aqueous electrolyte solution for a lithium secondary battery according to claim 1, wherein the ester-based compound having a branched-chain alkyl group is at least one selected from the group consisting of isobutyl propionate, isoamyl propionate, isobutyl butylate, ethyl 2-methyl butylate, methyl 2-methyl butyrate, methyl isovalerate, propyl-2-methyl butylate, propyl isovalerate and propyl isobutylate.

* * * * *